United States Patent [19]

Bosshart et al.

[11] Patent Number: 4,481,237

[45] Date of Patent: Nov. 6, 1984

[54] METHOD OF APPLYING CERAMIC COATINGS ON A METALLIC SUBSTRATE

[75] Inventors: George S. Bosshart, Vernon; Alfred P. Matarese, North Haven, both of Conn.

[73] Assignee: United Technologies Corporation, Hartford, Conn.

[21] Appl. No.: 330,401

[22] Filed: Dec. 14, 1981

[51] Int. Cl.³ ............................................. B05D 3/02
[52] U.S. Cl. .................................. 427/376.4; 427/34; 427/380; 427/405; 427/419.2; 427/419.3; 428/610; 428/678
[58] Field of Search ....................... 428/610, 678, 937; 427/190, 191, 205, 34, 376.1, 376.4, 376.5, 318, 319, 405, 380, 419.2, 419.3, 419.4, 419.6

[56] References Cited

U.S. PATENT DOCUMENTS

| | | | |
|---|---|---|---|
| 3,091,548 | 5/1963 | Dillon | 117/70 |
| 3,576,672 | 4/1971 | Harris et al. | 117/235 |
| 3,679,418 | 7/1972 | Stroszynski | 96/86 |
| 3,742,585 | 7/1973 | Wentzell | 29/423 |
| 3,817,719 | 6/1974 | Schilke et al. | 29/182.5 |
| 3,879,831 | 4/1975 | Rigney et al. | 29/182.5 |
| 3,900,639 | 8/1975 | Lauterbach | 427/34 |
| 3,911,891 | 10/1975 | Dowell | 123/191 A |
| 3,918,925 | 11/1975 | McComas | 29/182.3 |
| 3,975,165 | 8/1976 | Elbert et al. | 29/182.2 |
| 4,055,705 | 10/1977 | Stecura et al. | 427/405 |
| 4,109,031 | 8/1978 | Marscher | 427/191 |
| 4,159,358 | 6/1979 | Hench et al. | 427/318 |
| 4,163,071 | 7/1979 | Weatherly et al. | 427/34 |
| 4,248,940 | 2/1981 | Goward et al. | 427/405 |
| 4,273,824 | 6/1981 | McComas et al. | 428/256 |
| 4,289,446 | 9/1981 | Wallace | 415/174 |
| 4,299,865 | 11/1981 | Clingman et al. | 427/376.4 |
| 4,321,310 | 3/1982 | Ulion et al. | 428/632 |

FOREIGN PATENT DOCUMENTS 2820289  11/1979  Fed. Rep. of Germany ...... 428/678

OTHER PUBLICATIONS

NASA Technical Memorandum, NASA-TM-73852, "Preliminary Study of Cyclic Thermal Shock Resistance of Plasma-Sprayed Zirconium Oxide Turbine Outer Air Seal Shrouds" by Robert C. Bill and Donald W. Wisander, Dec. 1977.

Primary Examiner—Sadie L. Childs
Attorney, Agent, or Firm—Robert C. Walker

[57] ABSTRACT

Structure coated with graded ceramic material and methods of coating application are disclosed. Techniques for maintaining low stress to strength ratios across the depth of the coating are discussed. In one particular structure the coating is applied to a metal substrate (12) and comprises a metallic bond coat (14), a first interlayer (16) of metal/ceramic material, a second interlayer (18) of metal/ceramic material having an increased proportion of ceramic and an all ceramic layer. Modulation of the metal substrate temperature during the coating process establishes a desired residual stress pattern in the part.

6 Claims, 5 Drawing Figures

ND OF APPLYING CERAMIC COATINGS
ON A METALLIC SUBSTRATE

DESCRIPTION

1. Technical Field

This invention relates to ceramic thermal barrier coatings, and particularly to coatings graded from metallic to ceramic composition.

The concepts were developed in the gas turbine engine industry for use in the fabrication of turbine outer air seals, but have wider applicability both within that industry and others as well.

2. Background Art

In modern gas turbine engines, working medium gases having temperatures in excess of two thousand degrees Fahrenheit (2000° F.) are expanded across rows of turbine blading for extraction of power from the flowing medium. A shroud, termed an outer air seal, circumscribes each row of turbine blading to inhibit the leakage of working medium gases over the blade tips.

The graded ceramic coatings and methods of application described herein were developed for specific use in conjunction with turbine outer air seals. Durable structures capable of long term, reliable service in the hostile turbine environment were sought. Specific needs are high temperature capability and good resistance to thermal shock. Additionally, the seal material must have adequate surface abradability to prevent destructive interference upon the occurrence of rubbing contact of the seal by circumscribed rotor blades.

U.S. Pat. Nos. 3,091,548 to Dillion entitled "High Temperature Coatings"; 3,817,719 to Schilke et al entitled "High Temperature Abradable Material and Method of Preparing Same"; 3,879,831 to Rigney et al entitled "Nickel Base High Temperature Abradable Material"; 3,911,891 to Dowell entitled "Coating for Metal Surfaces and Method for Application"; 3,918,925 to McComas entitled "Abradable Seal"; 3,975,165 to Elbert et al entitled "Graded Metal-to-Ceramic Structure for High Temperature Abradable Seal Applications and a Method of Producing Said"; and 4,109,031 to Marscher entitled "Stress Relief of Metal-Ceramic Gas Turbine Seals" are representative of the known concepts applicable to ceramic faced seals.

As is discussed in some of the above references and in particular detail in U.S. Pat. No. 4,163,071 to Weatherly et al entitled "Method for Forming Hard Wear-Resistant Coatings", the temperature of the metallic substrate to which the ceramic coating is applied may be preheated to control either residual stress or coating density. Generally, such heating has been to a uniform temperature.

Although many of the materials and methods described in the above patents are known to be highly desirable, the structures resulting therefrom have yet to achieve full potential, particularly in hostile environment applications. Significant research into yet improved materials and methods continues.

DISCLOSURE OF INVENTION

According to the present invention, graded layers of metal/ceramic material having increasing ceramic composition are sequentially applied to a metal substrate under conditions of varied substrate temperatures, including the deposition of one or more layers at an initial temperature greater than or equal to the final temperature at which the prior layer was deposited, and a final temperature less than or equal to the temperature at which the subsequent layer is to be deposited.

According to one detailed method, the graded layers are continuously applied with variations in the metal/ceramic composition being made without interrupting the coating process and variations in substrate temperature being made in transition zones during the coating process.

A primary feature of the present invention is the control of thermal strain mismatch. Substrate temperature control during the coating process establishes a temperature characteristic in the coated part at which material within the part is essentially stress free. Modulation of the substrate temperature, not only at each successive layer, but also during deposition of the uniform composition layer itself, incorporates a preferred distribution of residual strain through the layers.

A principal advantage of the present invention is attainment of safe stress to strength ratios in the coating. Safe ratios are maintained throughout the range of temperatures and temperature gradients to which the part is exposed during its operating cycle. Failure of the coating is prevented even under temperature conditions which may vary as much as two thousand degrees Fahrenheit (2000° F.). As the part is initially heated in an operative environment, residual compressive stresses in the ceramic are relaxed. Further heating induces tensile thermal stresses in ceramic, but not to such values as would cause failure.

The foregoing, features and advantages of the present invention will become more apparent in the light of the following description of the best mode for carrying out the invention and the accompanying drawing.

BEST MODE FOR CARRYING OUT THE INVENTION

Figure 1:
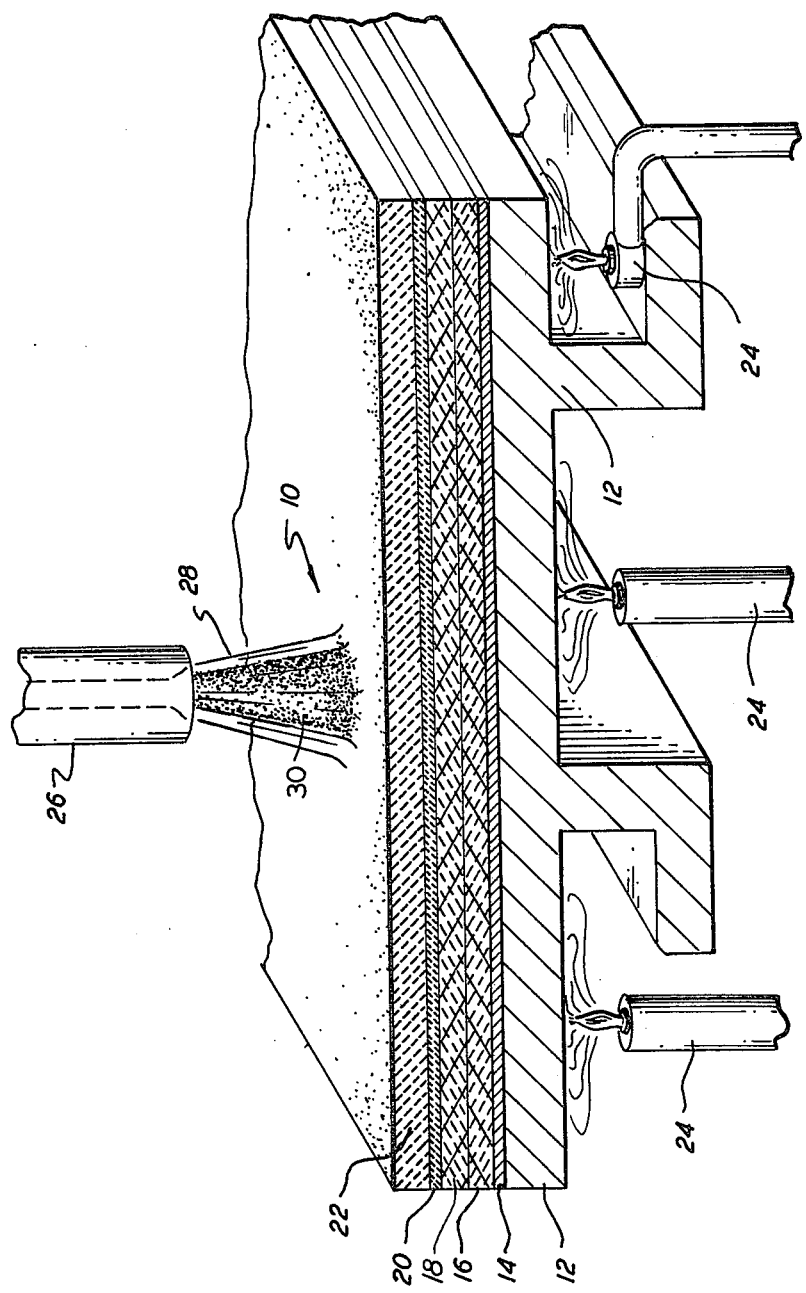
FIG. 1 is a simplified illustration of the process of coating a ceramic faced seal of a gas turbine engine.

The process of the present invention for applying a graded ceramic coating to a metal substrate and the resultant structure are illustrated with respect to an outer air seal 10 of the type utilized in a gas turbine engine. The metal substrate 12 is typically manufactured of a nickel base alloy, such as the alloy known in the gas turbine industry as INCONEL ® 713, and has a bond coat or layer 14 of metallic material adhered thereto. A typical bond coat material is the nickel-chrome-aluminum alloy known in the gas turbine industry as METCO ® 443.

Adhered to the bond coat 14 are one or more interlayers of graded metal/ceramic material of increasing ceramic composition. In a two interlayer, embodiment, a first interlayer 16 may, for example, be a mixture of zirconium oxide ($ZrO_2$) by weight forty percent (40%) and CoCrAlY material by weight sixty percent (60%). The CoCrAlY material of one effective embodiment has the nominal composition: chromium 23.0%; aluminum 13.0%; yttrium 0.65%; and balance essentially cobalt. The second interlayer 18 may, for example be a mixture of zirconium oxide ($ZrO_2$) by weight eighty-five percent (85%) and CoCrAlY material by weight fifteen percent (15%), the CoCrAlY material having the same composition utilized in the first layer. In such embodiments, each succeeding metal/ceramic layer has a higher proportion of ceramic material than the prior layer and a lesser proportion of ceramic material than the layer to be subsequently applied.

One hundred percent (100%) ceramic material, zirconium oxide ($ZrO_2$), is applied over the last metal/ceramic interlayer. In a preferred form two layers of deposition are utilized: a first layer 20 of dense ceramic and a second layer 22 of porous ceramic. In practice, the porous layer is of decreased density and is applied as a mixture of zirconium oxide ($ZrO_2$) powders with two and one-half to ten percent (2½–10%) by weight of polyester. The polyester is removed subsequent to deposition to leave a porous ceramic face. Heating of the outer air seal at manufacture or in situ during operation is utilized to bake the polyester material from the ceramic. Percentages of polyester outside the above range may be utilized to produce correspondingly varied porosity.

The purpose of the ceramic facing material in an outer air seal structure is twofold: to provide a thermal barrier, shielding the substrate from the hot working medium gases of the turbine to which the substrate would be otherwise exposed, and to provide an abradable seal accommodating thermal excursions of the circumscribed rotor blades without destructive interference.

During the coating process, the temperature of the substrate is controlled in predetermined degree for establishing residual stress and strain patterns in the manufactured seal. Substrate heaters 24 are provided for this purpose. The coatings themselves are applied by plasma spray techniques conventional in the industry. A plasma spray gun 26 in which the powders, or mixture of powders are injected, is caused to traverse in repeating pattern across the substrate as the coating is built to the desired depth. A plasma stream 28 carries the coating powders 30 to the surface of the article to be coated. Coating mixtures are preferably changed in continuous operation. Changes in substrate temperature are made as rapidly as possible in transition zones, immediately prior to, during or immediately subsequent to each powder composition change.

Figure 2:
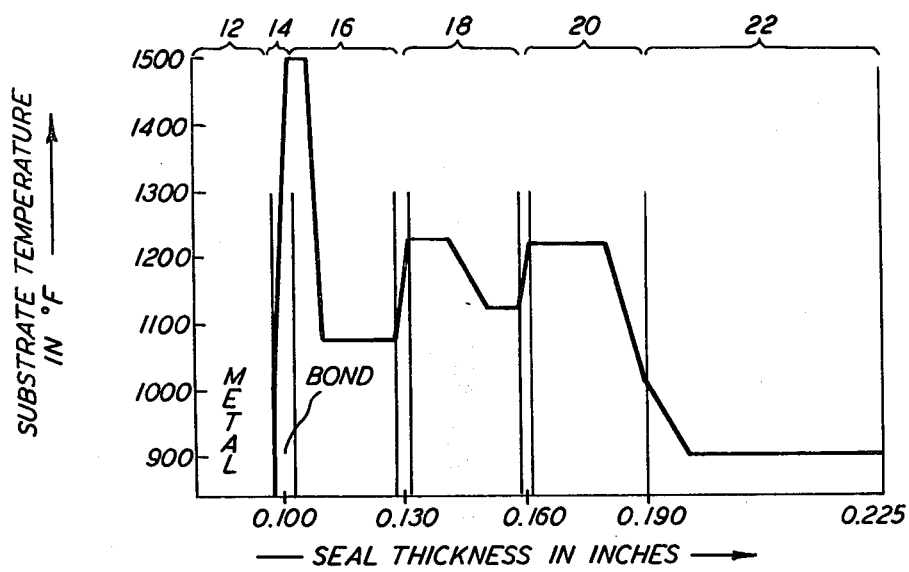
FIG. 2 is a graph illustrating temperature control of the metal substrate to which a graded ceramic coating is applied by the method of the present invention.

The substrate temperature cycle for coating the abovedescribed component is displayed by the FIG. 2 graph. The coating layers with initial and final substrate temperatures at deposition is as follows:

| Coating Layer | Depth | Initial Temp. | Final Temp. |
| --- | --- | --- | --- |
| Metallic Bond Coat | ≅.003 | 1000° F. | 1500° F. |
| First Interlayer | ≅.030 | 1500° F. | 1075° F. |
| Second Interlayer | ≅.030 | 1225° F. | 1125° F. |
| Dense Ceramic | ≅.030 | 1215° F. | 1010° F. |

-continued

| Coating Layer | Depth | Initial Temp. | Final Temp. |
| --- | --- | --- | --- |
| Porous Ceramic | ≅.035 | 1010° F. | 900° F. |

As is viewable both in the above table and in the FIG. 2 graph, each interlayer of metal/ceramic composition is applied under varied conditions of substrate temperature, at an initial temperature higher than the temperature at final deposition of the prior layer and a final temperature lower than or equal to the temperature at which the subsequent layer is to be initially deposited. The substrate temperature at final deposition of each interlayer is also lower than the substrate temperature at initial deposition of that interlayer. Step changes in temperature at the interface between differing compositions are likely desired. Practical considerations in a continuously coating process, however, suggest a transition zone such as appears in proximity to the composition change.

Figure 3:
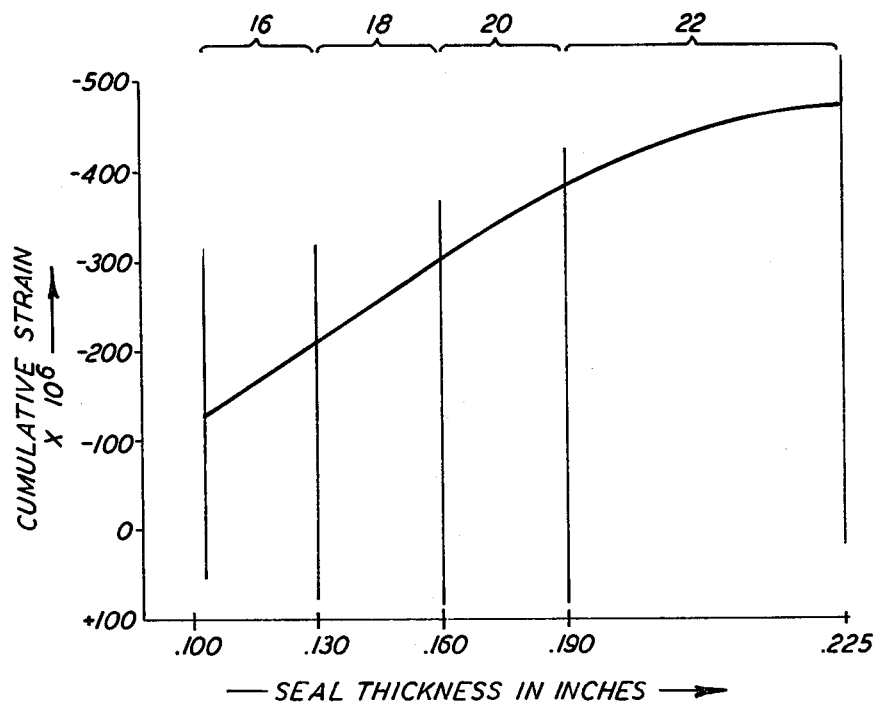
FIG. 3 is a graph depicting residual strain at room temperature plotted as a function of coating depth in a coating applied by the method of the present invention.

The inherently differing coefficients of thermal expansion between all ceramic material and all metal substrates are accommodated by grading the coatings and by inducing compressive strain during layer deposition. The cumulative strain graph set forth in FIG. 3 is characteristic of parts manufactured by the present method. The graph shows increasing compressive strain measured at the back of the substrate as incremental changes in coating depth are made. The smoothly increasing strain indicates the lack of severe discontinuity at any coating depth. Strain reversals, if occurring, would appear as peaks or valleys along the curve.

Figure 4:
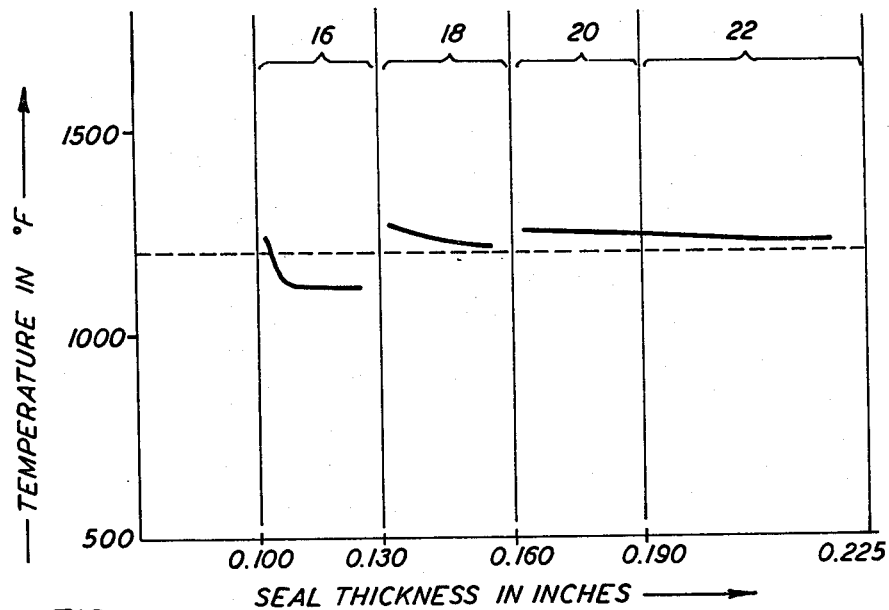
FIG. 4 is a graph depicting the stress free temperature characteristic of a ceramic coating applied by the method of the present invention.

As is discussed previously, the coating is designed to have a stress free characteristics at a preselected temperature. The stress free temperature is intermediate of the cold condition and the maximum temperature. FIG. 4 illustrates an essentially stress free structure at a temperature of approximately twelve hundred degrees Fahrenheit (1200° F.). Stress values at various coating depths in the differing composition materials are plotted. As the temperature of the structure is reduced from the stress free temperature, the metal substrate side of the structure tends toward tensile stress and the ceramic side tends toward compressive stress. As the temperature of the structure is increased above the stress free temperature, the metal substrate side tends toward compressive stress and the ceramic side tends toward tensile stress.

Figure 5:
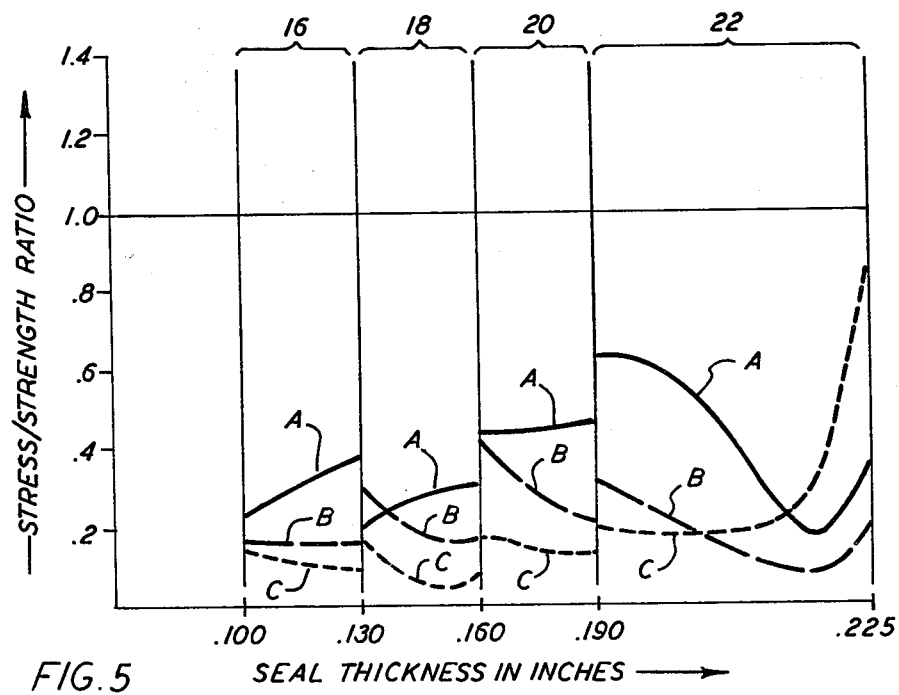
FIG. 5 is a graph depicting the stress to strength ratio of a ceramic coating applied to a turbine outer air seal by the method of the present invention under engine accel to sea level takeoff condition, sea level takeoff condition, and decel to idle condition.

FIG. 5 is a graph displaying stress to strength ratios across the coating cross section as a function of engine condition. Conditions illustrated are accel to sea level takeoff (A); steady state sea level takeoff (B); and decel from sea level takeoff to idle (C). Under all conditions, the stress to strength ratio in each layer of material remains well below a ratio of one (1.0), above which failure is expected. Excessive stress induced by differential strain between layers is avoided. The effect of substrate temperature control and the differing coefficients of thermal expansion between materials of the successive layers are matched to achieve that result.

Although this invention has been shown and described with respect to detailed embodiments thereof, it will be understood by those skilled in the art that various changes in form and detail thereof may be made without departing from the spirit and scope of the claimed invention.

We claim:

1. A method for applying a ceramic coating layer to a metallic substrate including the application of first a metallic bond layer and subsequently one or more graded interlayers of metallic/ceramic material between the metallic substrate and the ceramic coating layer wherein the improvement comprises:

controlling the metallic substrate temperature during the interlayer and ceramic deposition steps such that the temperature of the substrate at initial deposition of the material comprising each interlayer is greater than or equal to the temperature of the substrate at final deposition of the material comprising the prior applied layer, and such that the temperature of the substrate at final deposition of the material comprising said interlayer is lower than the temperature at initial deposition of that interlayer and lower than or equal to the substrate temperature at which the subsequent layer is to be applied.

2. The method according to claim 1 which further includes the step of applying ceramic material over the deposited interlayer at a substrate temperature which is greater than or equal to the temperature at which the final deposition of interlayer material occurred.

3. The method according to claim 2 wherein the ceramic layer is applied in a plurality of depositions made at decreasing metallic substrate temperature.

4. The method according to claims 2 or 3 wherein the ceramic layer is applied at a first density and subsequently at a second density which is less than said first density.

5. The method according to claims 1, 2 or 3 wherein the material comprising the metallic/ceramic interlayers and the ceramic layers is applied in a continuous coating process and wherein the substrate temperature at material composition changes is varied during the continuous process at transition zones of short duration.

6. The method according to claim 4 wherein the material comprising the metallic/ceramic interlayers and the ceramic layers is applied in a continuous coating process and wherein the substrate temperature at material composition changes is varied during the continuous process at transition zones of short duration.

* * * * *